(12) United States Patent
Ota et al.

(10) Patent No.: US 11,104,343 B2
(45) Date of Patent: Aug. 31, 2021

(54) DRIVING FORCE CONTROL SYSTEM FOR VEHICLE

(71) Applicant: TOYOTA JIDOSHA KABUSHIKI KAISHA, Toyota (JP)

(72) Inventors: Junya Ota, Susono (JP); Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/714,935

(22) Filed: Dec. 16, 2019

(65) Prior Publication Data
US 2020/0189599 A1 Jun. 18, 2020

(30) Foreign Application Priority Data
Dec. 17, 2018 (JP) .............................. JP2018-235713

(51) Int. Cl.
*B60K 17/16* (2006.01)
*B60W 30/18* (2012.01)

(52) U.S. Cl.
CPC ..... *B60W 30/18172* (2013.01); *B60K 17/165* (2013.01); *B60W 2520/10* (2013.01); *B60W 2520/266* (2013.01); *B60W 2520/30* (2013.01); *B60W 2710/12* (2013.01); *B60W 2720/266* (2013.01)

(58) Field of Classification Search
CPC ..... B60W 30/18172; B60W 2520/266; B60W 2520/30; B60W 2720/266; B60W 2710/12; B60W 2520/10; B60W 2710/083; B60W 30/20; B60W 2520/28; B60W 2540/18; B60W 2520/26; B60W 2720/403; B60W 2720/26; B60K 17/165; B60K 23/04
See application file for complete search history.

(56) References Cited

FOREIGN PATENT DOCUMENTS

JP 2004-351945 A 12/2004

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

A driving force control system for a vehicle configured to eliminate slippage of a wheel without changing a driving torque or a braking torque abruptly. The driving force control system comprises a drive unit and a controller. The drive unit includes a differential mechanism connected to a right wheel and a left wheel to distribute torque of a torque generating device, and a differential restricting device that restricts a differential rotation between the right wheel and the left wheel. The controller restricts a differential rotation between the right wheel and the left wheel less than a predetermined value by the differential mechanism. If a slip ratio of one of the wheels smaller than that of the other wheels is greater than an acceptable value, the controller executes a slip-eliminating control.

6 Claims, 13 Drawing Sheets

DRIVING FORCE CONTROL SYSTEM FOR VEHICLE

CROSS REFERENCE TO RELATED APPLICATIONS

The present application claims the benefit of priority to Japanese Patent Application No. 2018-235713 filed on Dec. 17, 2018 with the Japanese Patent Office, the entire contents of which are incorporated herein by reference in its entirety.

BACKGROUND

Field of the Invention

Present disclosure relates to the art of a driving force control system for a vehicle that controls a driving force and a braking force of the vehicle in the event of slippage of a wheel.

Discussion of the Related Art

JP-A-2004-351945 describes a control system for a vehicle comprising: a front power transmission route for delivering a torque of a prime mover to a pair of front wheels; a rear power transmission route for delivering a torque of the prime mover to a pair of rear wheels; and a clutch device that controls transmission torques of the front power transmission route and the rear power transmission route. In the event of slippage of any one of the pair of front wheels and the pair of rear wheels, the control system taught by JP-A-2004-351945 increases a transmission torque of the clutch device with an increase in a slip ratio.

As described in JP-A-2004-351945, the slippage of the front wheels or the rear wheels may be eliminated by increasing the transmission torque of the clutch device to reduce torque of the slipping wheel. For example, in the event of slippage of any one of a right front wheel and a left front wheel, such slippage of the wheel may be eliminated by the teachings of JP-A-2004-351945. However, the vehicle described in JP-A-2004-351945 is not provided with a torque generating device for generating a braking torque in a transmission route between a prime mover and drive wheels. In the vehicle described in JP-A-2004-351945, therefore, the braking torque is generated by a brake mechanism arranged in the drive wheel. In the vehicle of this kind, the braking torque applied to the slipping wheel is reduced by an anti-locking brake system or the like. In this situation, in order to avoid an interference between the control executed by the anti-locking brake system and the control to engage the clutch device, the transmission torque of the clutch device may be reduced. If the clutch device is disengaged or the transmission torque of the clutch device is reduced in the event of slippage of the wheel, the torques of the right wheel and the left wheel may be imbalanced and changed abruptly.

SUMMARY

Aspects of embodiments of the present disclosure have been conceived noting the foregoing technical problems, and it is therefore an object of the present disclosure to provide a driving force control system for a vehicle configured to eliminate slippage of a pair of wheels without changing a driving torque or a braking torque abruptly.

The exemplary embodiment of the present disclosure relates to a driving force control system for a vehicle comprising a drive unit and a controller that controls the drive unit. According to the exemplary embodiment of the present disclosure, the drive unit includes: a torque generating device that generates a driving torque or a braking torque; a differential mechanism that is connected to a right wheel and a left wheel in such a manner as to allow the right wheel and the left wheel to rotate differentially from each other, and to distribute the torque generated by the torque generating device to the right wheel and the left wheel; and a differential restricting device that restricts a differential rotation between the right wheel and the left wheel. In order to achieve the above-explained objective, according to the exemplary embodiment of the present disclosure, the controller is configured to: calculate a slip ratio of the right wheel as a ratio of a difference between an actual speed of the right wheel and a theoretical speed of the right wheel calculated based on a speed of the vehicle to the theoretical speed; calculate a slip ratio of the left wheel as a ratio of a difference between an actual speed of the left wheel and a theoretical speed of the left wheel calculated based on the speed of the vehicle to the theoretical speed; restrict a differential rotation between the right wheel and the left wheel less than a predetermined value by the differential mechanism; and execute a slip-eliminating control to restrict the driving torque or the braking torque generated by the torque generating device thereby reducing the slip ratio of one of the wheel whose slip ratio is smaller than the slip ratio of the other one of the wheels, if the slip ratio of one of the wheels that is smaller than the slip ratio of the other one of the wheels is greater than an acceptable value.

In a non-limiting embodiment, the drive unit may be connected to a pair of front wheels, and the driving force control system may further comprise a brake mechanism that applies a braking torque to a pair of rear wheels. The controller may comprise: a first map that determines a relation between the braking force applied to the pair of front wheels and the braking force applied to the pair of rear wheels when the pair of front wheels and the pair of rear wheels slip simultaneously during decelerating the vehicle; and a second map that reduces the braking force applied to the pair of rear wheels compared to the braking force determined with reference to the first map. The controller may be further configured to: calculate the braking force applied to the pair of front wheels and the braking force applied to the pair of rear wheels with reference to the first map when the slip-eliminating control is not executed; and calculate the braking force applied to the pair of rear wheels with reference to the second map when the braking force applied to the pair of front wheels is reduced as a result of executing the slip-eliminating control.

In a non-limiting embodiment, the controller may be further configured to: reduce the driving torque or the braking torque generated by the torque generating device if the difference between the actual speed and the theoretical speed of the one of the wheel whose slip ratio is smaller than the other wheel during execution of the slip-eliminating control is greater than a predetermined value; and increase the driving torque or the braking torque generated by the torque generating device if the difference between the actual speed and the theoretical speed of the one of the wheel whose slip ratio is smaller than the other wheel during execution of the slip-eliminating control is less than the predetermined value.

In a non-limiting embodiment, the controller may be further configured to terminate the slip-eliminating control when the driving torque or the braking torque generated by the torque generating device is increased to a required torque of the vehicle during execution of the slip-eliminating control.

Thus, according to the exemplary embodiment of the present disclosure, the torque generating device is arranged on an input side of the differential mechanism that distributes torque to the right wheel and the left wheel. As described, the controller restricts the differential rotation between the right wheel and the left wheel less than the predetermined value by the differential mechanism. In addition, if the slip ratio of one of the wheels that is smaller than the slip ratio of the other one of the wheels is greater than an acceptable value, the controller executes the slip-eliminating control to restrict the torque generated by the torque generating device thereby reducing the slip ratio of one of the wheel whose slip ratio is smaller than the slip ratio of the other one of the wheels. According to the exemplary embodiment of the present disclosure, therefore, the torque of the torque generating device will not be changed abruptly when eliminating slippage of the wheel. For this reason, the driver may be prevented from feeling uncomfortable feeling when eliminating the slippage. In addition, the driving torque and the braking torque will not be applied individually to each driveshaft simultaneously. For this reason, an occurrence of resonance of the driveshafts may be prevented. Further, since only one of the right wheel and the left wheel whose slip ratio is smaller than the other one is controlled to eliminate the slippage, the driving torque and the braking torque will not be reduced excessively.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
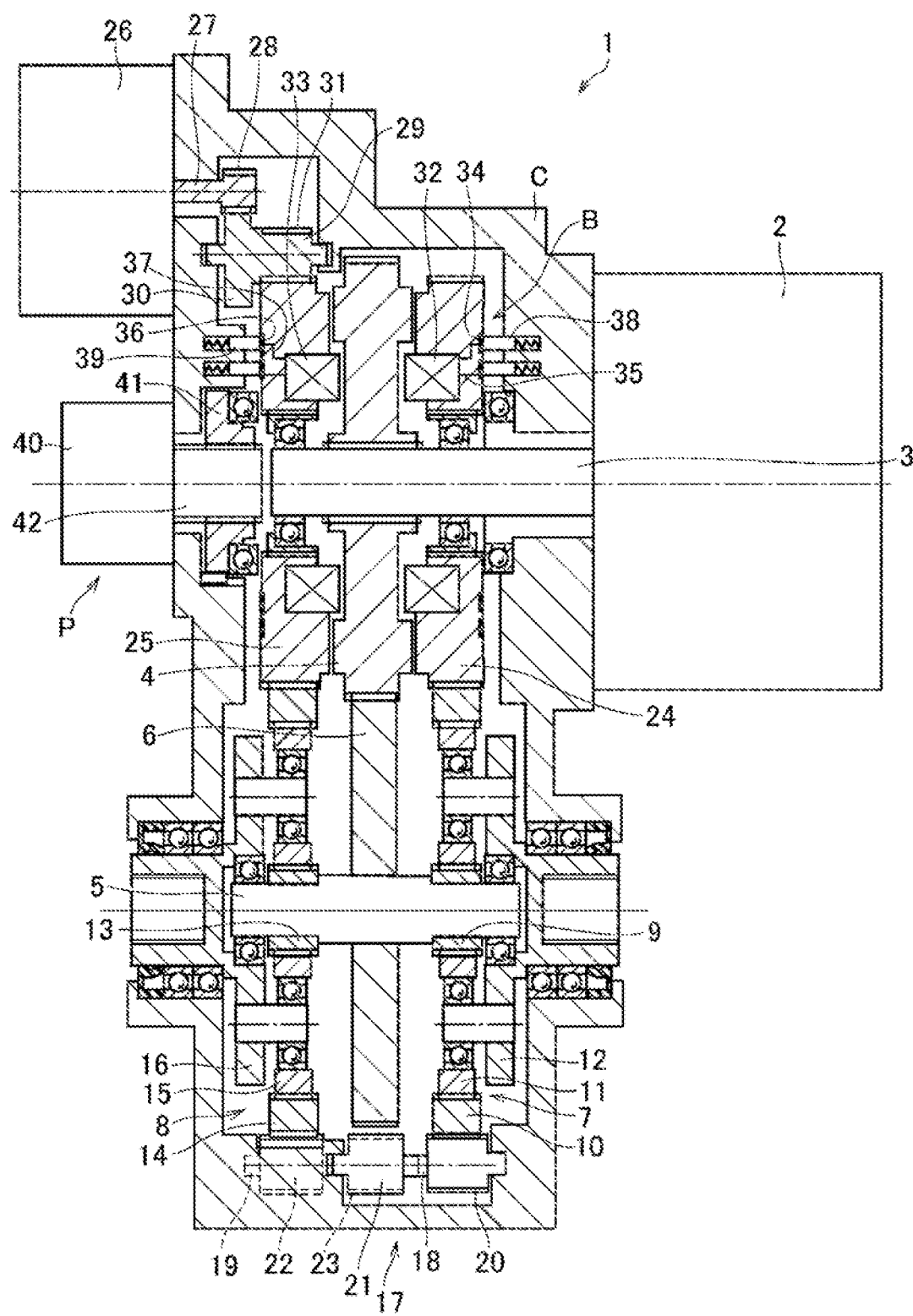
FIG. 1 is a cross-sectional view showing one example of a structure of a drive unit of a vehicle to which the driving force control system according to the embodiment of the present disclosure is applied.

An exemplary embodiment of the present disclosure will now be explained with reference to the accompanying drawings. Referring now to FIG. 1, there is schematically shown a structure of a drive unit 1 of a vehicle Ve to which the driving force system according to the preferred embodiment of the present disclosure is applied. The drive unit 1 comprises: a torque generating device that generates a driving torque or a braking torque; a differential mechanism that distributes the torque generated by the torque generating device to a right wheel and a left wheel; and a differential restricting device that restricts a differential rotation between the right wheel and the left wheel.

As illustrated in FIG. 1, the drive unit 1 is provided with a drive motor 2 serving as a torque generating device of the embodiment of the present disclosure. For example, as a conventional hybrid vehicle and an electric vehicle, a permanent magnet synchronous motor-generator may be adopted as the drive motor 2. The drive motor 2 may serve not only as a prime mover to generate a driving torque for propelling the vehicle Ve but also as a brake to generate a braking torque for decelerating the vehicle Ve.

An output shaft 3 of the drive motor 2 extends in a width direction of the vehicle Ve, and a drive gear 4 formed of a magnetic body is fitted onto the output shaft 3. A transmission shaft 5 extends in parallel with the output shaft 3 of the drive motor 2, and a driven gear 6 is fitted onto an intermediate portion of the transmission shaft 5 while being meshed with the drive gear 4.

A first planetary gear unit 7 is connected to one end of the transmission shaft 5, and a second planetary gear unit 8 is connected to the other end of the transmission shaft 5. According to the exemplary embodiment of the present disclosure, a single-pinion planetary gear unit is adopted as the first planetary gear unit 7 and the second planetary gear unit 8 respectively.

The first planetary gear unit 7 comprises: a first sun gear 9 fitted onto the transmission shaft 5; a first ring gear 10 as an internal gear arranged concentrically with the first sun gear 9; a plurality of first planetary gears 11 interposed between the first sun gear 9 and the first ring gear 10 at predetermined intervals; and a first carrier 12 supporting the first planetary gears 11 in a rotatable manner. One of drive shafts (not shown) is joined to the first carrier 12 so that the first carrier 12 serves as an output element.

The second planetary gear unit comprises: a second sun gear 13 fitted onto the transmission shaft 5; a second ring gear 14 as an internal gear arranged concentrically with the second sun gear 13; a plurality of second planetary gears 15 interposed between the second sun gear 13 and the second ring gear 14 at predetermined intervals; and a second carrier 16 supporting the second planetary gears 15 in a rotatable manner. The other one of drive shafts (not shown) is joined to the second carrier 16 so that the second carrier 16 serves as an output element. Teeth number of the first sun gear 9 and teeth number of the second sun gear 13 are identical to each other, and teeth number of the first ring gear 10 and teeth number of the second ring gear 14 are identical to each other.

Outer teeth are formed around the first ring gear 10 and the second ring gear 14 respectively. The first ring gear 10 and the second ring gear 14 are connected to each other through a torque reversing mechanism 17 so that torque applied to one of the first ring gear 10 and the second ring gear 14 is transmitted to the other one of the first ring gear 10 and the second ring gear 14 while being reversed.

The torque reversing mechanism 17 comprises a first rotary shaft 18 and a second rotary shaft 19 individually extending parallel to the output shaft 3. A first pinion gear 20 is formed on one end of the first rotary shaft 18 to be meshed with the outer teeth of the first ring gear 10, and a second pinion gear 21 is formed on the other end of the first rotary shaft 18. Likewise, a third pinion gear 22 is formed on one end of the second rotary shaft 19 to be meshed with the outer teeth of the second ring gear 14, and a fourth pinion gear 23 is formed on the other end of the second rotary shaft 19 to be meshed with the second pinion gear 21. Here, teeth number of the first pinion gear 20 and teeth number of the third pinion gear 22 are identical to each other, and teeth number of the second pinion gear 21 and teeth number of the fourth pinion gear 23 are identical to each other. Number of the outer teeth of the first ring gear 10 and number of the outer teeth of the second ring gear 14 are also identical to each other.

A first brake gear 24 is fitted onto the output shaft 3 while being allowed to rotate relatively to the output shaft 3 and to reciprocate on the output shaft 3, and a second brake gear 25 is also fitted onto the output shaft 3 across the drive gear 4 while being allowed to rotate relatively to the output shaft 3 and to reciprocate on the output shaft 3. The first brake gear 24 is meshed with the outer teeth of first ring gear 10, and the second brake gear 25 is meshed with the outer teeth of second ring gear 14.

In order to apply torque to the second brake gear 25, the drive unit 1 is provided with a differential motor 26. An output shaft 27 of the differential motor 26 extends parallel to the output shaft 3 of the drive motor 2, and an output gear 28 is fitted onto a leading end of the output shaft 27. A countershaft 29 extends between the output shaft 27 of the differential motor 26 and the second rotary shaft 19 in parallel to those shafts, and a driven gear 30 that is diametrically larger than the output gear 28 is formed on one end of the countershaft 29 while being meshed with the output gear 28. A drive gear 31 that is diametrically smaller than the second brake gear 25 is fitted onto the other end of the countershaft 29 while being meshed with the second brake gear 25. That is, an output torque of the differential motor 26 is applied to the second brake gear 25 while being multiplied by two gears.

In the drive unit 1, torque of the drive motor 2 is distributed to the first planetary gear unit 7 and the second planetary gear unit 8 through the transmission shaft 5, and further distributed to the right wheel and the left wheel. A torque distribution ratio to the right wheel and to the left wheel varies depending on a magnitude of a reaction torque established by the first ring gear 10, and a magnitude of a reaction torque established by the second ring gear 14. For example, when the differential motor 26 stops, same magnitude of torque is delivered from the drive motor 2 to the first ring gear 10 and the second ring gear 14. In this situation, therefore, the torque of the first ring gear 10 and the torque of the second ring gear 14 counteract against each other, and the torque is distributed to the right wheel and the left wheel equally at the ratio of 50 percent each. When the differential motor 26 generates torque thereby increasing the reaction torque of the second ring gear 14, the reaction torque of the first ring gear 10 is reduced by the torque of the differential motor 26 transmitted through the torque reversing mechanism 17. Consequently, the torque delivered to the second planetary gear unit 8 is increased larger than the torque delivered to the first planetary gear unit 7. Thus, the ratio of the torque distributed to the right wheel and the left wheel may be altered by controlling the torque of the differential motor 26.

During turning of the vehicle Ve, the right wheel and the left wheel are rotated at different speeds. In this situation, such speed difference between the right wheel and the left wheel may be absorbed by the differential motor 26. Specifically, such differential rotation between the right wheel and the left wheel may be absorbed by controlling the torque by the feedback method in such a manner that a rotational speed of the differential motor 26 is reduced to zero. Accordingly, the differential motor 26 and the torque reversing mechanism 17 serve as a "differential rotation restricting mechanism" of the embodiment of the present disclosure.

The drive unit 1 comprises a brake mechanism B, and the braking torque generated by the brake mechanism B may be distributed to the right wheel and the left wheel. The brake mechanism B comprises a first coil 32 fitted into a depression formed on the first brake gear 24 to be opposed to the drive gear 4, and a second coil 33 fitted into a depression formed on the second brake gear 25 to be opposed to the drive gear 4. In order to supply current to the first coil 32, a lead wire 35 is arranged in the first brake gear 24 to connect the first coil 32 to an annular first terminal 34 attached to a face of the first brake gear 24 opposed to a case C. Likewise, in order to supply current to the second coil 33, a lead wire 37 is arranged in the second brake gear 25 to connect the second coil 33 to an annular second terminal 36 attached to a face of the second brake gear 25 opposed to the case C. The first terminal 34 is contacted to a first brush 38 arranged in the case C, and the second terminal 36 is contacted to a second brush 39 arranged in the case C. Each of the first brush 38 and the second brush 39 is made of thin metal material so that the first brush 38 and the second brush 39 are deformed elastically to be contacted to the first terminal 34 and the second terminal 36 respectively when the first terminal 34 and the second terminal 36 are reciprocated in the axial direction.

In the brake mechanism B, an electromagnetic force is applied to the drive gear 4 in accordance with current supplied to the first coil 32 and the second coil 33, and the first brake gear 24 and the second brake gear 25 are brought into contact to the drive gear 4 by the electromagnetic force. As described, the first brake gear 24 and the second brake gear 25 are rotated to absorb the difference in the rotational speeds of the right wheel and the left wheel. To this end, each of the first brake gear 24 and the second brake gear 25 is rotated individually at an extremely low speed. By thus bringing the first brake gear 24 and the second brake gear 25 into contact to the drive gear 4, a braking torque is established by the drive gear 4, and the braking torque is applied to the right wheel and the left wheel.

In order to maintain a contact pressure between the second brake gear 25 and the drive gear 4 when the power is off, the drive unit 1 is provided with a parking lock mechanism P. The parking lock mechanism P comprises a parking lock motor 40 attached to the case C in an opposite side to the second brake gear 25, and an annular pushing plate 41 fitted onto an output shaft 42 of the parking lock motor 40. An outer circumference of the pushing plate 41 is splined to the case C. A thread formed on the output shaft 42 of the parking lock motor 40 is mated with a thread formed on an inner circumference of a center hole of the pushing plate 41 so that the pushing plate 41 is actuated by the parking lock motor 40 in the axial direction to push the second brake gear 25. A pressure angle between those threads is set in such a manner that the pushing plate 41 can be reciprocated in the axial direction by activating the parking lock motor 40, but torque will not act strongly in a rotational direction of the output shaft 42 when the pushing plate 41 is reciprocated. Therefore, even if a current supply to the parking lock motor 40 is stopped after pushing the second brake gear 25 onto the drive gear 4 by the pushing plate 41, the contact pressure between the second brake gear 25 and the drive gear 4 can be maintained.

Figure 2:
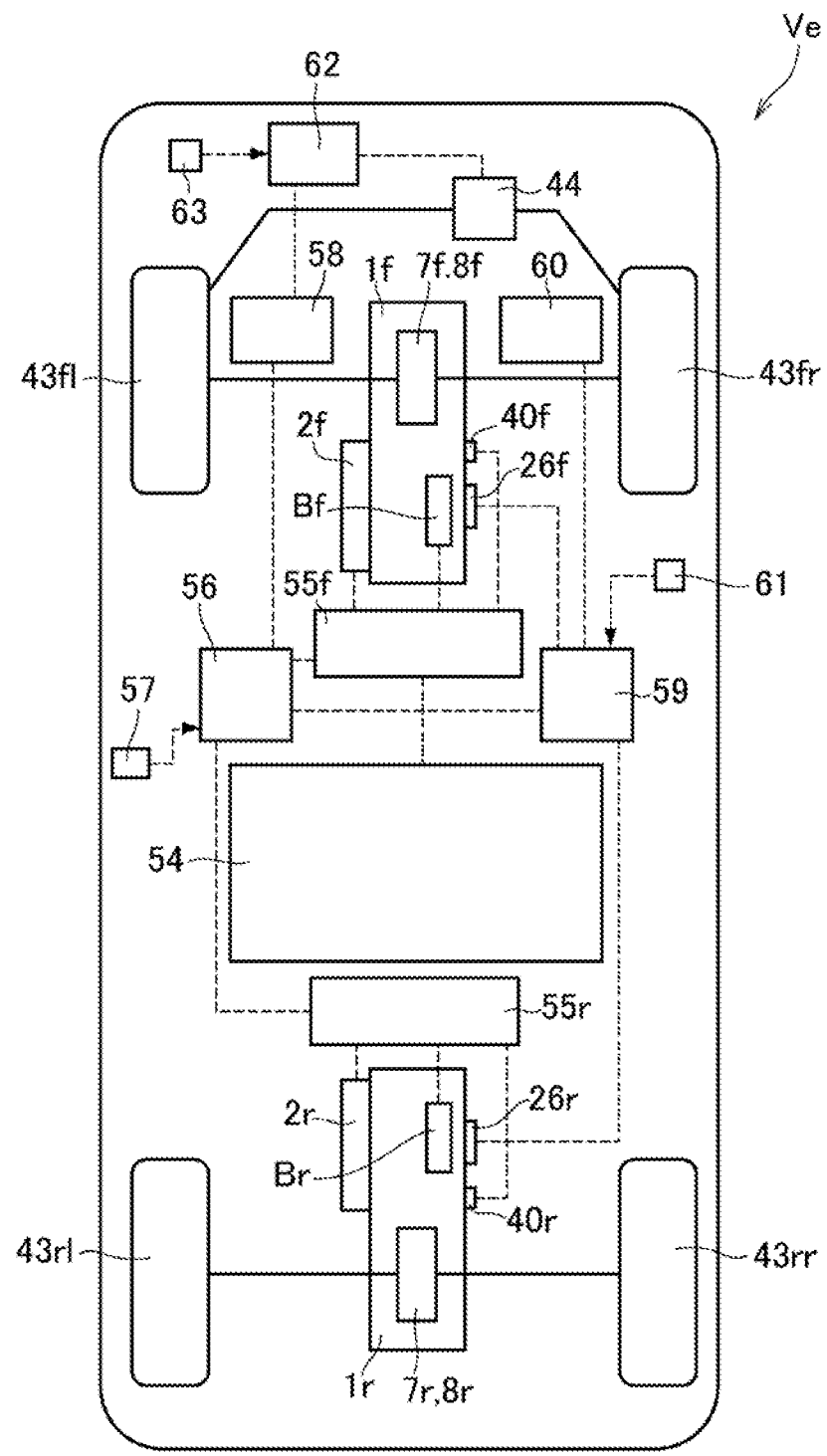
FIG. 2 is a schematic illustration showing a structure of the driving force control system according to the embodiment of the present disclosure.

Turning to FIG. 2, there is shown one example of a structure of a vehicle Ve in which the drive unit 1 is connected to a pair of front wheels 43fr and 43fl, and to a pair of rear wheels 43rr and 43rl, respectively. In FIG. 2, electrical connections are indicated by dashed lines, and the reference letter "f" designates members arranged in the front section and the reference letter "r" designates members arranged in the rear section.

Figure 3:
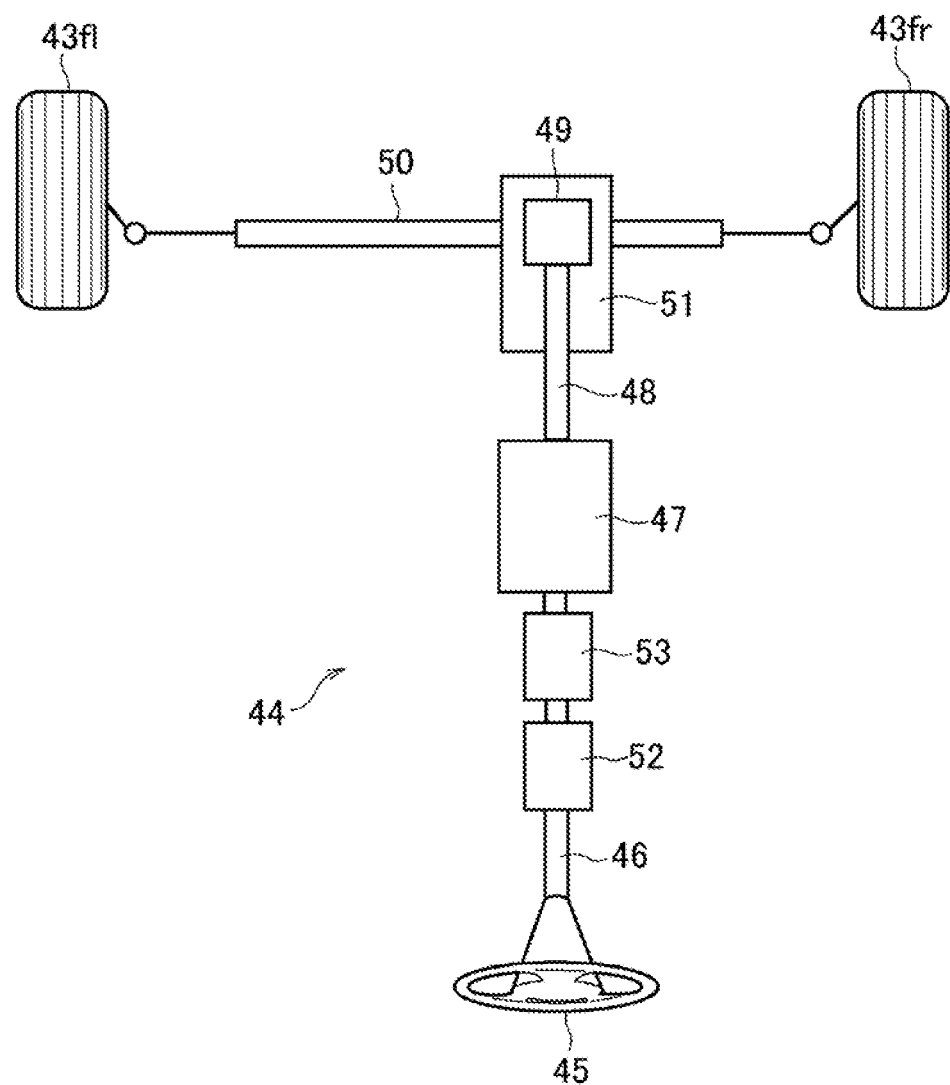
FIG. 3 is a schematic illustration showing one example of a structure of a steering mechanism of the vehicle.

In the vehicle Ve shown in FIG. 2, a steering mechanism 44 is disposed between the front wheels 43fr and 43fl to turn those wheels. The steering mechanism 44 is adapted to control a turning angle of the pair of front wheels 43fl and 43fr in accordance with an operation amount (i.e., a turning angle) of an after-mentioned steering wheel 45. The steering mechanism 44 is further adapted to control a turning angle of the pair of front wheels 43fr and 43fl independently from an operation of the steering wheel 45 as necessary. A structure of the steering mechanism 44 is shown in FIG. 3 in more detail.

In the steering mechanism 44, the steering wheel 45 is attached to an upper end of an upper steering shaft 46. The upper steering shaft 46 is connected to a lower steering shaft 48 through a variable gear ratio steering (to be abbreviated as "VGRS" hereinafter) 47. The VGRS 47 comprises a carrier connected to the upper steering shaft 46 while supporting pinion gears in a rotatable manner, a sun gear connected to a VGRS motor while being meshed with the pinion gears, and a ring gear connected to the lower steering shaft 48. Therefore, a ratio of a rotational angle of the upper steering shaft 46 to a rotational angle of the lower steering shaft 48 can be varied continuously by controlling a rotational angle of the VGRS 47.

A pinion gear 49 is attached to a lower end of the lower steering shaft 48 while being meshed with a rack bar 50 in which gear teeth are formed on an outer surface. The rack bar 50 is reciprocated in the width direction of the vehicle Ve in accordance with a rotational angle of the lower steering shaft 48. A right front wheel 43fr is connected to a right end of the rack bar 50 through a right tie rod and a knuckle, and a left front wheel 43fl is connected to a left end of the rack bar 50 through a left tie rod and a knuckle.

An assist torque is applied to the lower steering shaft 48 by an electric power steering motor (to be abbreviated as the "EPS motor" hereinafter) 51. On the upper steering shaft 46, a steering angle sensor 52 is arranged to detect a turning angle of the steering wheel 45, and a steering torque sensor 53 is arranged to detect a steering torque of the steering wheel 45.

Turning back to FIG. 2, in the vehicle Ve, the front drive motor 2f, the front differential motor 26f, and the front brake mechanism Bf are electrically connected with a high-voltage power storage device 54 including a battery and a capacitor, as a conventional power storage device used in hybrid vehicles and electric vehicles. A front inverter 55f is interposed between the power storage device 54 and the motors 2f and 26f or the coils 32f and 33f. The front inverter 55f is adapted to switch current supplied to the motors 2f and 26f or the coils 32f and 33f between direct current and alternate current, and to control values and frequencies of the current.

The rear drive motor 2r, the rear differential motor 26r, and the rear brake mechanism Br are also electrically connected with the power storage device 54. A rear inverter 55r is interposed between the power storage device 54 and the motors 2r and 26r or the coils 32r and 33r. The rear inverter 55r is adapted to switch current supplied to the motors 2r and 26r or the coils 32r and 33r between direct current and alternate current, and to control values and frequencies of the current.

The front inverter 55f and the rear inverter 55r are connected with a first electronic control unit (to be abbreviated as the "first ECU" hereinafter) 56 as a first controller that controls the front drive motor 2f, the front differential motor 26f, the front brake mechanism Bf, the rear drive motor 2r, the rear differential motor 26r, and the rear brake mechanism Br. As the conventional electronic control units, the first ECU 56 comprises a microcomputer as its main constituent.

For example, the first ECU 56 receives signals from various sensors 57 for detecting a depression of an accelerator pedal, a depression of a brake pedal, a steering angle of the steering wheel 45, a steering torque of the steering wheel 45, a speed of the vehicle Ve, speeds of each of the wheels 43, a longitudinal acceleration of the vehicle Ve, a yaw rate of the vehicle Ve, a state of charge level of the power storage device 54, a temperature of the power storage device 54 and so on. The first ECU 56 transmits control signals to the front inverter 55f, the rear inverter 55r and so on, based on the incident signals as well as formulas and maps installed in advance. In FIG. 2, only one sensor 57 is depicted for the sake of illustration.

A first auxiliary battery 58 is arranged to supply power for operating the first ECU 56 and for controlling a transistor (not shown) installed in the front inverter 55f. A voltage of the first auxiliary battery 58 is lower than a voltage of the power storage device 54.

The front parking lock mechanism Pf controls a contact pressure between the pushing plate 41f and the second brake gear 25f to serve as a backup of the front brake mechanism Bf, and the rear parking lock mechanism Pr controls a contact pressure between the pushing plate 41r and the second brake gear 25r to serve as a backup of the rear brake mechanism Br. In order to control the parking lock mechanisms Pf and Pr in the event of failure of an electric system including the first ECU 56 and the first auxiliary battery 58 or an electric system including the power storage device 54 and the inverter 55f or 55r, the driving force control system according to the embodiment is provided with another electronic control unit (to be abbreviated as the "backup ECU" hereinafter) 59. As the first ECU 56, the backup ECU 59 also comprises a microcomputer as its main constituent.

For example, the backup ECU 59 receives signals from sensors 61 representing a depression of the brake pedal, current values supplied to the brake mechanisms Bf and Br, speeds of each of the wheels 43 and so on. The backup ECU 59 transmits control signals to the front parking lock mechanism Pf and the rear parking lock mechanism Pr based on the incident signals as well as formulas and maps installed in advance. The backup ECU 59 and the parking lock mechanisms Pf and Pr are activated by power supplied from a second auxiliary battery 60. In FIG. 2, only one sensor 61 is connected with the backup ECU 59 for the sake of illustration. The backup ECU 59 may receive the signals transmitted from the first ECU 56, and the backup ECU 59 may be activated in the event of failure of the first ECU 56.

In order to control the steering mechanism 44, the driving force control system according to the embodiment is provided with a second electronic control unit (to be abbreviated as the "second ECU" hereinafter) 62 as a second controller. Specifically, the second ECU 62 controls the EPS motor 51 and the VGRS motor 47 of the steering mechanism 44. To this end, signals representing a steering angle of the steering wheel 45, a steering torque of the steering wheel 45, a yaw rate of the vehicle Ve etc. are transmitted to the second ECU 62 from sensors 63. The second ECU 62 transmits control signals to the EPS motor 51 and the VGRS motor 47 based on the incident signals as well as formulas and maps installed in advance. In FIG. 2, only one sensor 63 is connected with the second ECU 62 for the sake of illustration.

Figure 4:
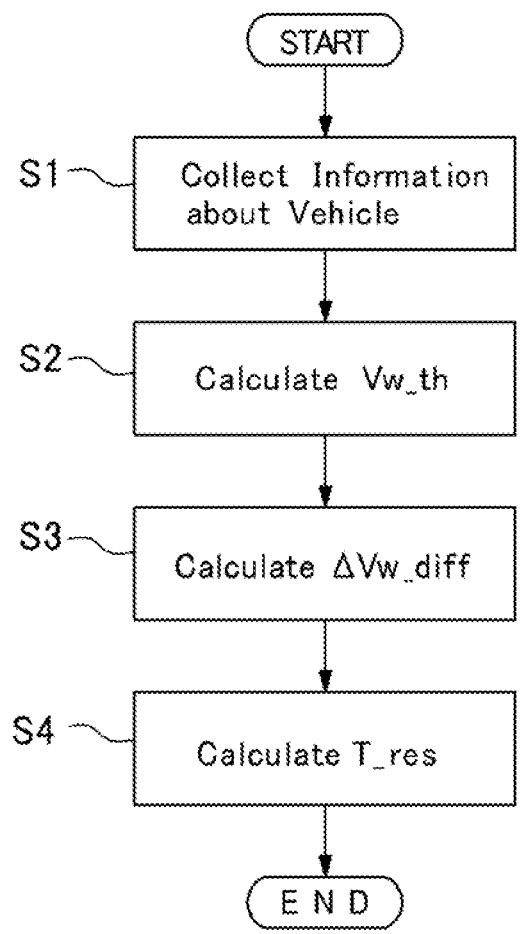
FIG. 4 is a flowchart showing one example of a routine to control a differential motor.

FIG. 4 shows one example of a routine to control torques of the right front wheel 43$fr$ and the left front wheel 43$fl$ executed by the first ECU 56. Here, it is to be noted that torques of the right rear wheel 43$rr$ and the left rear wheel 43$rl$ may also be controlled by the procedures shown in FIG. 4. At step S1, various information about the vehicle Ve is collected. Specifically, at least a speed of the vehicle Ve, speeds of each of the wheels 43$fr$ and 43$fl$, and a steering angle of the steering wheel 45 are obtained at step S1.

At step S2, a theoretical wheel speed Vw_th of each of the right front wheel 43$fr$ and the left front wheel 43$fl$ is calculated respectively, based on a speed of the vehicle Ve calculated based on an average value of the wheels 43$fr$, 43$fl$, 43$rr$, and 43$rl$, and a turning radius of the vehicle Ve. The theoretical speed of the right front wheel 43$fr$ thus calculated corresponds to a "theoretical speed of the right wheel" of the embodiment, and the theoretical speed of the left front wheel 43$fl$ thus calculated corresponds to a "theoretical speed of the left wheel" of the embodiment.

Then, the routine progresses to step S3 to calculate a difference ΔVw_diff between: a difference ΔVw_th between the theoretical speeds of the right front wheel 43$fr$ and the left front wheel 43$fl$ calculated at step S2 (as will be simply called the "theoretical speed difference hereinafter); and a difference ΔVw_act between actual speeds of the right front wheel 43$fr$ and the left front wheel 43$fl$ (as will be simply called the "actual speed difference hereinafter) detected by the wheel speed sensor.

Figure 5A:
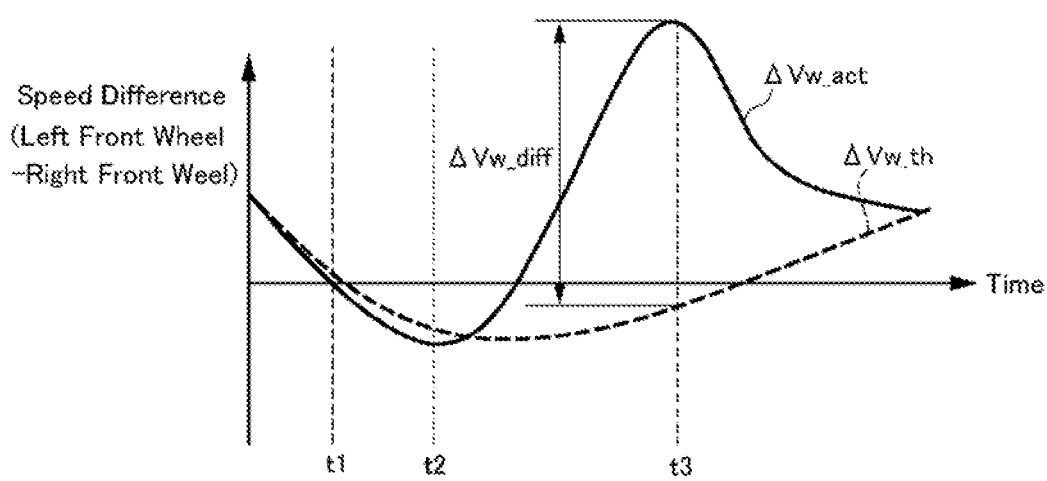
FIGS. 5A and 5B are time charts indicating temporal changes in a speed difference between a right wheel and a left wheel in the event of slippage of the right wheel.
Figure 5B:
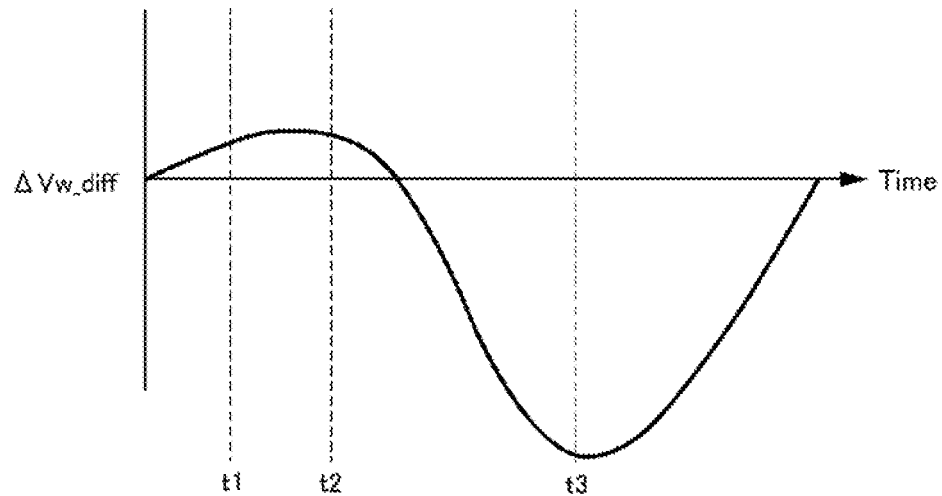

FIGS. 5A and 5B show temporal changes in the theoretical speed difference ΔVw_th, the actual speed difference ΔVw_act, and the difference ΔVw_diff between the theoretical speed difference ΔVw_th and the actual speed difference ΔVw_act, in a case of turning the steering wheel 45 to the right, then to the left, and then to the right again while decelerating the vehicle Ve.

In FIG. 5A, the vehicle axis represents a difference between speeds of the right front wheel 43$fr$ and the left front wheel 43$fl$ calculated by subtracting the speed of the right front wheel 43$fr$ from the speed of the left front wheel 43$fl$. In the example shown in FIG. 5A, the vehicle Ve is turned to the right before point t1, and in this situation, neither of the right front wheel 43$fr$ and the left front wheel 43$fl$ slips. That is, slippage between the right front wheel 43$fr$ and the road surface, and slippage between the left front wheel 43$fl$ and the road surface falls within an allowable range respectively. In this situation, therefore, the theoretical speed difference ΔVw_th and the actual speed difference ΔVw_act are substantially identical to each other. That is, the difference ΔVw_diff between the theoretical speed difference ΔVw_th and the actual speed difference ΔVw_act is relatively small. Then, slippage of the right front wheel 43$fr$ is caused at point t2 as a result of decelerating the vehicle Ve during turning to the left, and is locked due to such slippage. That is, a rotational speed of the right front wheel 43$fr$ is reduced to zero at point t2. Consequently, the actual speed difference ΔVw_act is increased significantly from point t2 in a direction toward the positive value. On the other hand, the theoretical speed difference ΔVw_th stays negative in this situation. As a result, as indicated in FIG. 5B, the difference ΔVw_diff calculated by subtracting the actual speed difference ΔVw_act from the theoretical speed difference ΔVw_th changes significantly toward a negative value from point t2.

The slip of the right front wheel 43$fr$ is eliminated gradually from point t3 so that the actual speed difference ΔVw_act is reduced. In this situation, the steering wheel 45 is rotated to the right again so that the theoretical difference ΔVw_th is increased toward the positive value. As a result, at point t4, the difference ΔVw_diff indicated in FIG. 5B is converged to zero.

Figure 6:
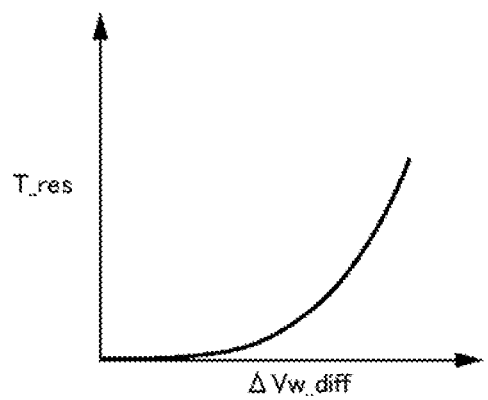
FIG. 6 is a map determining a correction amount of torque of a differential motor with respect to a difference between an actual speed difference of the wheels and a theoretical speed difference of the wheels.

Turning back to FIG. 4, at step S4, a torque T_res of the front differential motor 26$f$ to restrict a differential rotation between the right front wheel 43$fr$ and the left front wheel 43$fl$ less than a predetermined value is calculated based on the difference ΔVw_diff calculated at step S3. Thereafter, the routine returns. For example, the torque T_res of the front differential motor 26$f$ may be calculated sequentially based on gear ratios of the first planetary gear unit 7$f$ and the second planetary gear unit 8$f$. Instead, the torque T_res of the front differential motor 26$f$ may also be determined with reference to a map shown in FIG. 6. According to the example shown in FIG. 6, the map shown in FIG. 6 is configured to increase the torque T_res of the front differential motor 26$f$ exponentially with an increase in an absolute value of the difference ΔVw_diff between the actual speed difference ΔVw_act and the theoretical difference ΔVw_th.

By thus executing the routine shown in FIG. 4 in the event of slippage of any one of the right wheel and the left wheel, torque of the slipping wheel is reduced and torque of the other wheel is increased. Therefore, the slippage of the wheel can be eliminated without reducing a total driving force or braking force of the vehicle Ve. However, if both of the right wheel and the left wheel slip, such slippages of the right wheel and the left wheel may not be eliminated by reducing a differential rotation of the right wheel and the left wheel. In order to eliminate such slippages of both of the right wheel and the left wheel, the driving force control system according to the embodiment of the present disclosure executes a routine shown in FIG. 7 to reduce an output torque of the drive motor 2$f$ (or 2$r$) and a braking torque of the brake mechanism Bf (or Br). Hereinafter, an example of eliminating slippage of the pair of front wheels 43*fr* and 43*fl* will be explained with reference to FIG. 7. However, slippage of the pair of rear wheels 43*rr* and 43*rl* may also be eliminated by the procedures shown in FIG. 7. In the following examples, the definition of the driving torque is a positive torque, and the definition of the braking torque is a negative torque. In the following example, the braking torque is applied to the right front wheel 43*fr* and the left front wheel 43*fl* by operating the front drive motor 2*f* as a generator.

At step S11, various information about the vehicle Ve is collected. Specifically, the information collected at step S11 includes at least a vehicle speed V0, an actual speed Vw_fr_act of the right front wheel 43*fr*, an actual speed Vw_fl_act of the left front wheel 43*fl*, a rotational angle θstr of the steering wheel 45, a yaw rate γ, and a required torque Treq to rotate the pair of front wheels 43*fr* and 43*fl* (i.e., a required torque of the front drive motor 2*f*). For example, the vehicle speed V0 may be calculated based on an average value of an actual speed Vw_fr_act of the right front wheel 43*fr*, an actual speed Vw_fl_act of the left front wheel 43*fl*, an actual speed Vw_rr_act of the right rear wheel 43*rr*, and an actual speed Vw_rl_act of the left rear wheel 43*rl*. The required torque Treq may be obtained based on a depression of the accelerator pedal or the brake pedal, the vehicle speed and so on with reference to a conventional map for determining a driving force.

Then, the routine progresses to step S12 to calculate a theoretical speed Vw_fr_th of the right front wheel 43*fr* and a theoretical speed Vw_fl_th of the left front wheel 43*fl* based on the vehicle speed V0, and to calculate a slip ratio sr_fr of the right front wheel 43*fr*, and a slip ratio sr_fl of the left front wheel 43*fl*. Given that the vehicle Ve is turning to the right, the theoretical speed Vw_fr_th of the right front wheel 43*fr* may be calculated using the following formula:

$$Vw\_fr\_th = V0/\cos(\theta str) - track/2 \cdot \gamma \quad (1); \text{ and}$$

the theoretical speed Vw_fl_th of the left front wheel 43*fl* may be calculated using the following formula:

$$Vw\_fl\_th = V0/\cos(\theta str) + track/2 \cdot \gamma \quad (2),$$

where "track" is a distance between a width center of the right front wheel 43*fr* and a width center of the left front wheel 43*fl*. Likewise, given that the vehicle Ve is turning to the right, the slip ratio sr_fr of the right front wheel 43*fr* may be calculated using the following formula:

$$sr\_fr = (Vw\_fr\_th - Vw\_fr\_act)/Vw\_fr\_th \quad (3);$$

and
the slip ratio sr_fl of the left front wheel 43*fl* may be calculated using the following formula:

$$sr\_fl = (Vw\_fl\_th - Vw\_fl\_act)/Vw\_fl\_th \quad (4).$$

In a case of eliminating slippage of the pair of rear wheels 43*rr* and 43*rl*, a theoretical speed ΔVw_rr_th of the right rear wheel 43*rr* may be calculated using the following formula:

$$Vw\_rr\_th = V0 - track/2 \cdot \gamma \quad (5); \text{ and}$$

a theoretical speed Vw_rl_th of the left rear wheel 43*rl* may be calculated using the following formula:

$$Vw\_rl\_th = V0 + track/2 \cdot \gamma \quad (6).$$

Then, at step S13, a wheel F1 to be controlled to eliminate the slippage is selected. At step S13, specifically, the wheel whose absolute value of the slip ratio calculated at step S12 is smaller is selected as the wheel F1 to be controlled to eliminate the slippage.

In order to determine whether the slippage between the wheel F1 selected at step S13 and a road surface exceeds an acceptable value, at step S14, a threshold speed Vw_F1_ref of the slippage is calculated. Specifically, the threshold speed Vw_F1_ref may be calculated by multiplying the theoretical speed Vw_F1_th of the wheel F1 selected at step S13 by an acceptable slip ratio SlipTarget, as expressed by the following expression:

$$Vw\_F1\_th = Vb\_F1 \cdot \text{SlipTarget} \quad (7).$$

Here, in the event slippage of the wheel while breaking the vehicle Ve, the actual speed Vw_act of the wheel is slower than the theoretical speed Vw_th of the wheel. In this case, therefore, the acceptable slip ratio SlipTarget is set to a value smaller than 1. By contrast, in the event slippage of the wheel during driving the vehicle Ve, the actual speed Vw_act of the wheel is higher than the theoretical speed Vw_th of the wheel. In this case, therefore, the acceptable slip ratio SlipTarget is set to a value greater than 1.

Then, at step S15, a determination of an occurrence of a wheel slip is made so as to determine whether to execute a slip-eliminating control.

Figure 8:
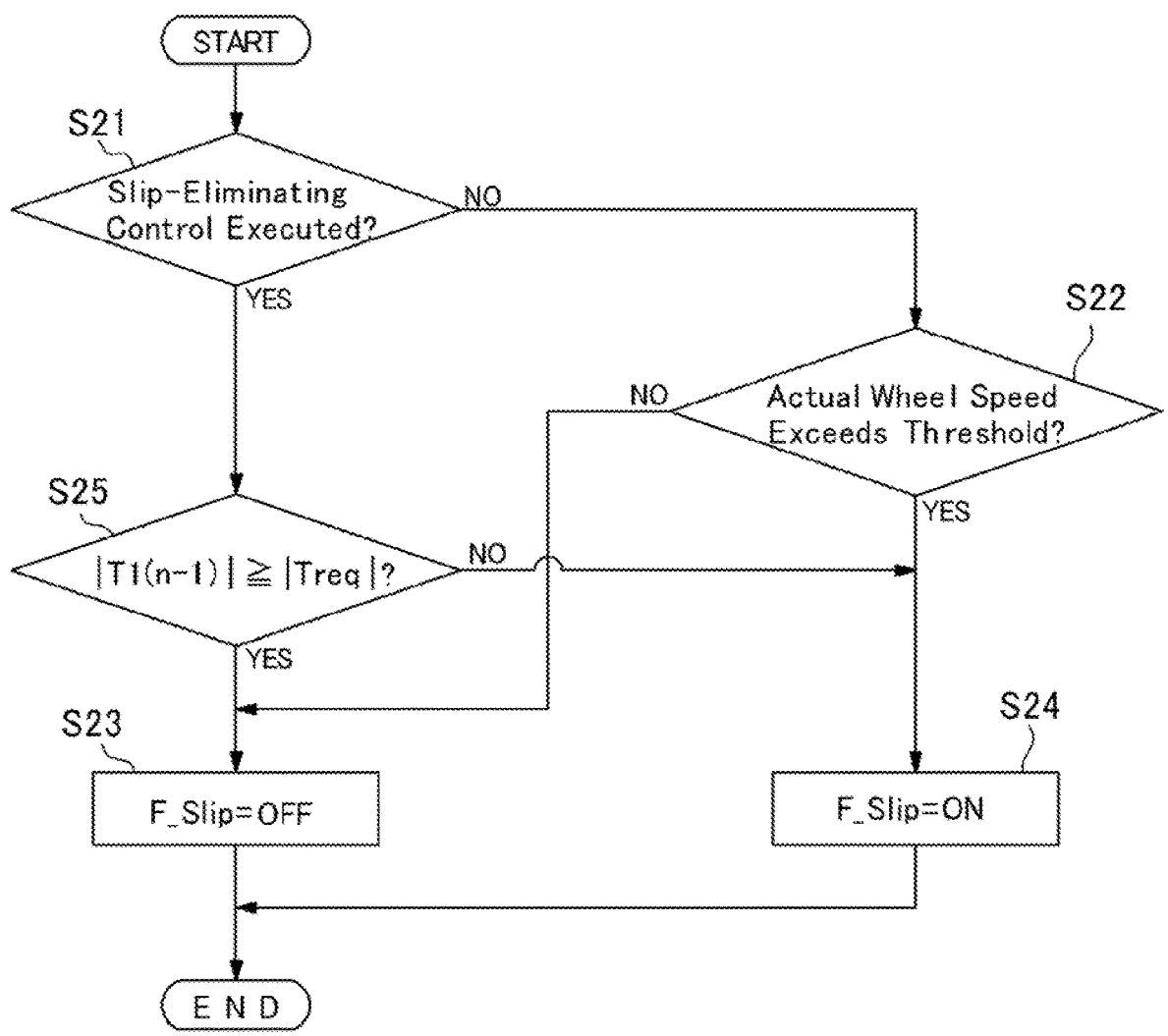
FIG. 8 is a flowchart showing an example of a subroutine to determine an occurrence of slippage.

FIG. 8 shows an example of a subroutine to determine an occurrence of a wheel slip. At step S21, it is determined whether the slip-eliminating control is in execution based on a slip flag F_Slip. As explained later, the slip flag F_Slip is turned on if the answer of below-mentioned step S22 is YES, and turned off if the answer of below-mentioned step S25 is YES.

If the slip-eliminating control is currently not executed so that the answer of step S21 is NO, the subroutine progresses to step S22 to determine whether e.g., the actual speed Vw_fr_act of the right front wheel 43*fr* selected as the wheel F1 at step S13 exceeds the threshold speed Vw_F1_ref. For example, if the vehicle Ve is decelerated in this situation, it is determined at step S22 whether the actual speed Vw_fr_act of the right front wheel 43*fr* is lower than the threshold speed Vw_F1_ref. By contrast, if the vehicle Ve is driven in this situation, it is determined at step S22 whether the actual speed Vw_fr_act of the right front wheel 43*fr* is higher than the threshold speed Vw_F1_ref.

If the actual speed Vw_fr_act of the right front wheel 43*fr* does not exceed the threshold speed Vw_F1_ref so that the answer of step S22 is NO, this means that the slip ratio sr_fr of the right front wheel 43*fr* falls within an acceptable range. That is, it is not necessary to execute the slip-eliminating control. In this case, therefore, the subroutine progresses to step S23 to turn off the slip flag F_Slip, and thereafter the subroutine terminates. By contrast, if the actual speed Vw_fr_act of the right front wheel 43*fr* exceeds the threshold speed Vw_F1_ref so that the answer of step S22 is YES, this means that the slip ratio sr_fr of the right front wheel 43*fr* exceeds the acceptable range. That is, it is necessary to execute the slip-eliminating control. In this case, therefore, the subroutine progresses to step S24 to turn on the slip flag F_Slip, and thereafter the subroutine terminates.

As explained later, during execution of the slip-eliminating control, the torque of the front drive motor 2*f* is temporarily reduced, and when the actual speed Vw_fr_act of the right front wheel 43*fr* varies close to the theoretical speed Vw_fr_th than the threshold speed Vw_F1_ref, the torque of the front drive motor 2*f* is gradually increased. That is, the slip-eliminating control will be terminated by demanding the front drive motor 2*f* to generate torque in accordance with an operation of the accelerator pedal or the brake pedal after eliminating the wheel slip. Therefore, if the slip-eliminating control is currently executed so that the answer of step S21 is YES, the subroutine progresses to step S25 to determine whether an absolute value of the torque T1(n−1) of the front drive motor 2f set in the previous routine is equal to or greater than an absolute value of the required torque Treq of the front drive motor 2f obtained at step S11.

If the absolute value of the torque T1(n−1) of the front drive motor 2f is less than the absolute value of the required torque Treq of the front drive motor 2f so that the answer of step S25 is NO, this means that the slip-eliminating control has not yet been completed. In this case, therefore, the subroutine progresses to step S24 to turn on the slip flag F_Slip, and thereafter the subroutine terminates. By contrast, if the absolute value of the torque T1(n−1) of the front drive motor 2f is equal to or greater than the absolute value of the required torque Treq of the front drive motor 2f so that the answer of step S25 is YES, this means that the slip-eliminating control has already been completed. In this case, therefore, the subroutine progresses to step S23 to turn off the slip flag F_Slip, and thereafter the subroutine terminates.

Turning back to FIG. 7, after thus determining an occurrence of the wheel slip at step S15, the routine progresses to step S16 to determine whether the slip flag F_Slip is turned on. If the slip flag F_Slip is turned off so that the answer of step S16 is NO, the routine progresses to step S17 to adjust the torque T1(n) of the front drive motor 2f to the required torque Treq obtained at step S11, and thereafter the routine returns. By contrast, if the slip flag F_Slip is turned on so that the answer of step S16 is YES, the routine progresses to step S18 to adjust the torque T1(n) of the front drive motor 2f to a torque calculated by adding a correction torque Tslipctrl set with reference to a map shown in FIG. 9 to the torque T1(n−1) of the front drive motor 2f set in the previous routine. Thereafter the routine returns. Accordingly, step S18 corresponds to the slip-eliminating control of the embodiment, and the required torque of the front drive motor 2f after executing the routine shown in FIG. 7 will be referred to as "T1".

Figure 9:
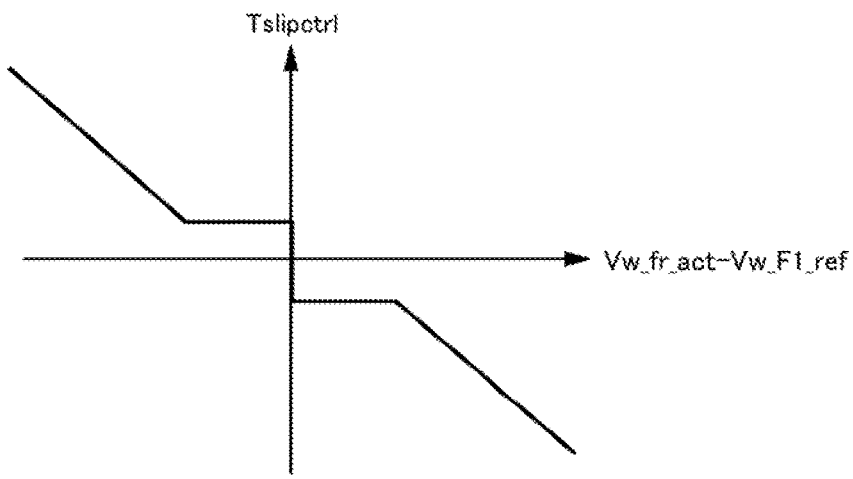
FIG. 9 is a map determining a correction amount of the torque of the drive motor based on a difference between an actual wheel speed and a threshold value.

In the map shown in FIG. 9, the horizontal axis represents a value calculated by subtracting the threshold speed Vw_F1_ref from the actual speed Vw_fr_act of the right front wheel 43fr, and the vertical axis represents the correction torque Tslipctrl. As can be seen from FIG. 9, the correction torque Tslipctrl is increased in the negative direction with an increase in the value Vw_fr_act−Vw_F1_ref in the positive direction, and increased in the positive direction with an increase in the value Vw_fr_act−Vw_F1_ref in the negative direction. That is, in the event slippage of the wheel during breaking the vehicle Ve, the value Vw_fr_act−Vw_F1_ref stays negative so that the correction torque Tslipctrl is set to a positive value. In this case, therefore, the braking torque is reduced at step S18. By contrast, after eliminating the slippage of the wheel, the value Vw_fr_act−Vw_F1_ref stays positive so that the correction torque Tslipctrl is set to a negative value. In this case, therefore, the braking torque is increased at step S18.

Figure 10:
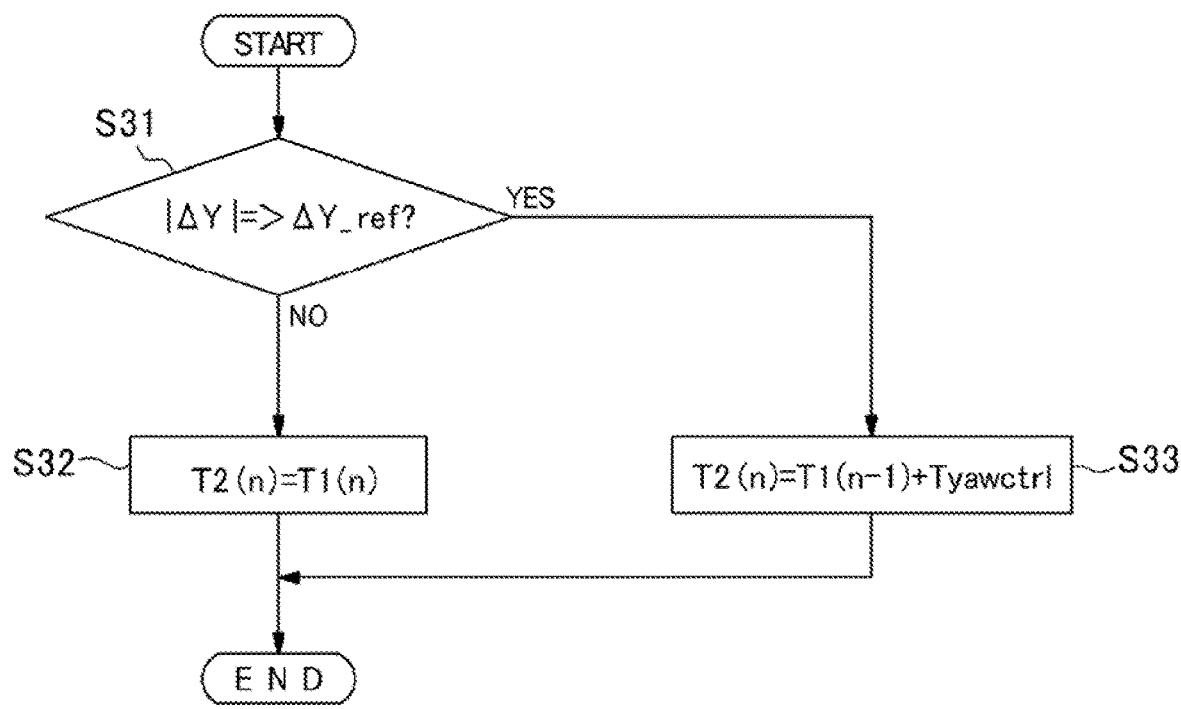
FIG. 10 is a flowchart showing an example of a routine to determine a correction torque of the drive motor to reduce a yaw rate.

When a difference between an actual yaw rate Y_act and a target yaw rate Y_tgt is large, the first ECU 56 executes a routine shown in FIG. 10 to reduce the torque of the front drive motor 2f thereby suppressing the actual yaw rate Y_act. To this end, at step S31, it is determined whether an absolute value of a difference ΔY between the actual yaw rate Y_act detected by the yaw rate sensor and the target yaw rate Y_tgt is equal to or greater than a threshold value ΔY_ref. Specifically, the target yaw rate Y_tgt is set within an acceptable range based on an operating amount of the steering wheel 45 and a speed of the vehicle Ve.

If the absolute value of the difference ΔY between the actual yaw rate Y_act and the target yaw rate Y_tgt is less than the threshold value ΔY_ref so that the answer of step S31 is NO, the routine progresses to step S32 to set a required torque T2(n) of the front drive motor 2f to the required torque T1 of the front drive motor 2f set at step S17 or S18. Thereafter, the routine returns. By contrast, if the absolute value of the difference ΔY between the actual yaw rate Y_act and the target yaw rate Y_tgt is equal to or greater than the threshold value ΔY_ref so that the answer of step S31 is YES, the routine progresses to step S33 to set the required torque T2(n) of the front drive motor 2f to a value calculated by adding a collection torque Tyawctrl set with reference to a map shown in FIG. 11 to the required torque T1 of the front drive motor 2f set at step S17 or S18. Thereafter, the routine returns.

Figure 11:
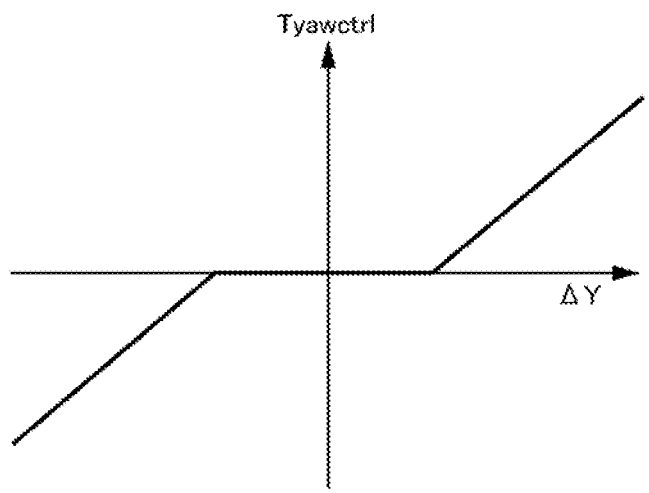
FIG. 11 is a map determining the correction torque of the drive motor based on a difference between an actual yaw rate and a target yaw rate.

In the map shown in FIG. 11, the horizontal axis represents the difference ΔY calculated by subtracting the target yaw rate Y_tgt from the actual yaw rate Y_act, a and the vertical axis represents the collection torque Tyawctrl. As can be seen from FIG. 11, in a case that the actual yaw rate Y_act is greater than the target yaw rate Y_tgt and the difference ΔY between the actual yaw rate Y_act and the target yaw rate Y_tgt is greater than a predetermined value, the correction torque Tyawctrl is increased in the positive direction with an increase in the difference ΔY. By contrast, in a case that the actual yaw rate Y_act is smaller than the target yaw rate Y_tgt and a difference between the difference ΔY between the actual yaw rate Y_act and the target yaw rate Y_tgt is greater than a predetermined value, the correction torque Tyawctrl is increased in the negative direction with a reduction in the difference ΔY.

Figure 12:
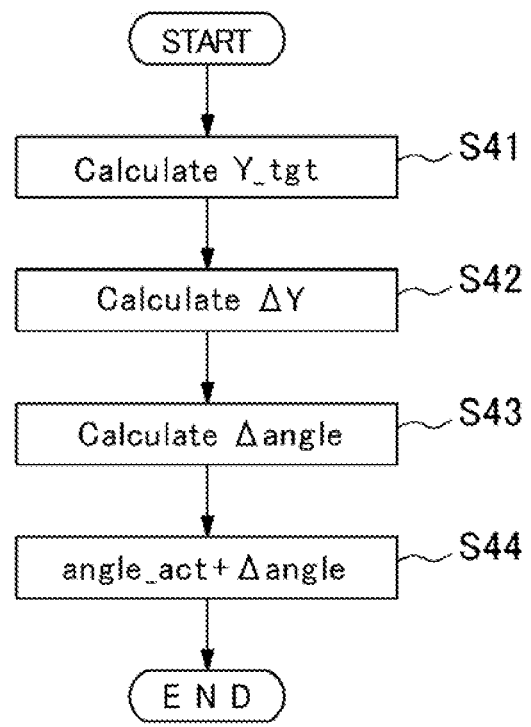
FIG. 12 is a flowchart to correct an angle of the wheels based on the difference between the actual yaw rate and the target yaw rate.

In the vehicle Ve shown in FIG. 2, a turning angle of the pair of front wheels 43fr and 43fl may be controlled by the VGRS motor independently from an operation of the steering wheel 45. Therefore, the VGRS motor may be controlled to adjust the turning angle of the pair of front wheels 43fr and 43fl by the procedures shown in FIG. 12, instead of executing the routine shown in FIG. 10, or in addition to execute the routine shown in FIG. 10. At step S41, the target yaw rate Y_tgt is calculated by a conventional calculation method based on a rotation (or an operating amount) of the steering wheel 45 and a speed of the vehicle Ve. Then, the difference ΔY between the target yaw rate Y_tgt and the actual yaw rate Y_act is calculated at step S42, and a correction amount Δangle of a turning angle of the pair of front wheels 43fr and 43fl is calculated at step S43 based on the difference ΔY. For example, the correction amount Δangle may be calculated with reference to a map shown in FIG. 13.

Figure 13:
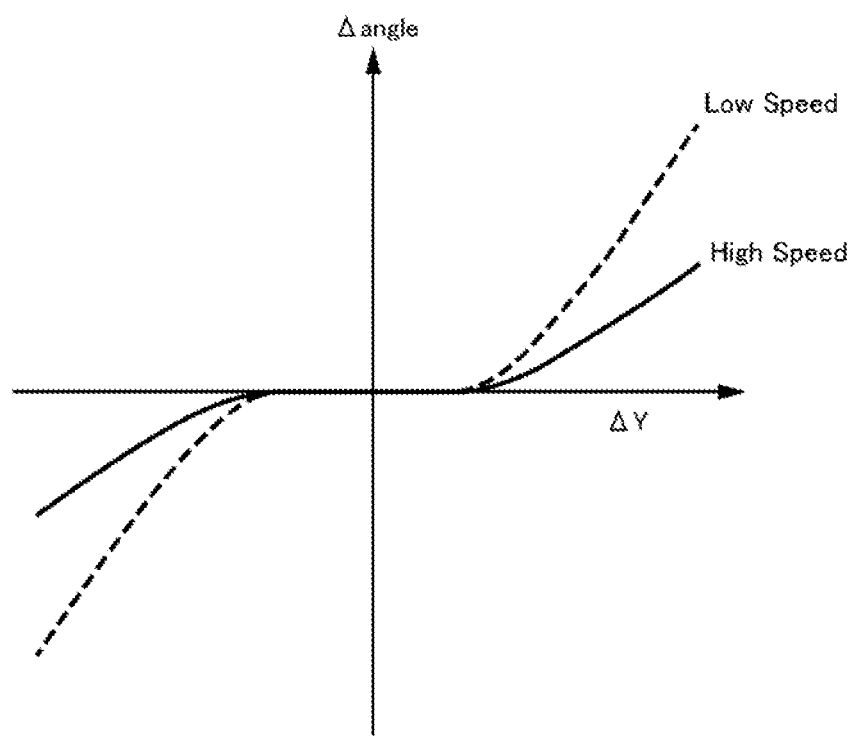
FIG. 13 is a map determining a correction amount of the angle of the wheels based on the difference between the target yaw rate and the actual yaw rate.

In the map shown in FIG. 13, the vertical axis represents the correction amount Δangle, and the horizontal axis represents the difference ΔY, the solid curve represents a relation between the difference ΔY and the correction amount Δangle in a high speed range, and the dashed curve represents a relation between the difference ΔY and the correction amount Δangle in a low speed range. As can be seen from FIG. 13, the map shown in FIG. 13 is configured to increase the correction amount Δangle with an increase in the difference ΔY, and the correction amount Δangle is further increased with a reduction in the speed of the vehicle Ve. Thereafter, the correction amount Δangle is added to a current control amount of a turning angle angle_act of the pair of front wheels 43fr and 43fl at step S44, and thereafter the routine returns.

Thus, in the drive unit 1, the torque generating device that generates a driving torque or a braking torque is arranged in the input side of the differential mechanism that distributes torque to the right wheel and the left wheel. In the event of slippage of the pair of right wheel and the left wheel, the driving force control system according to the embodiment of the present disclosure controls the torque of the differential motor in such a manner as to reduce a differential rotation between the right wheel and the left wheel, and reduces the torque of the torque generating device. According to the embodiment of the present disclosure, therefore, the torque generated by the torque generating device to eliminate the slippage of the wheels will not be changed abruptly to reduce uncomfortable feeling of the driver. In addition, the driving torque and the braking torque will not be applied individually to each of the driveshafts simultaneously. For this reason, an occurrence of resonance of the driveshafts may be prevented.

Further, since only one of the right wheel and the left wheel whose slip ratio is smaller is controlled to eliminate the slippage, the driving torque and the braking torque will not be reduced excessively. Furthermore, if an orientation of the vehicle Ve is changed undesirably from an intended orientation as a result of differentiating the driving forces or the braking forces of the right wheel and the left wheel to eliminate slippage, torque of the drive motor is corrected and a turning angle of the pair of wheels is adjusted. According to the embodiment of the present disclosure, therefore, a stability of the vehicle Ve may be ensured during execution of the slip-eliminating control.

Figure 14:
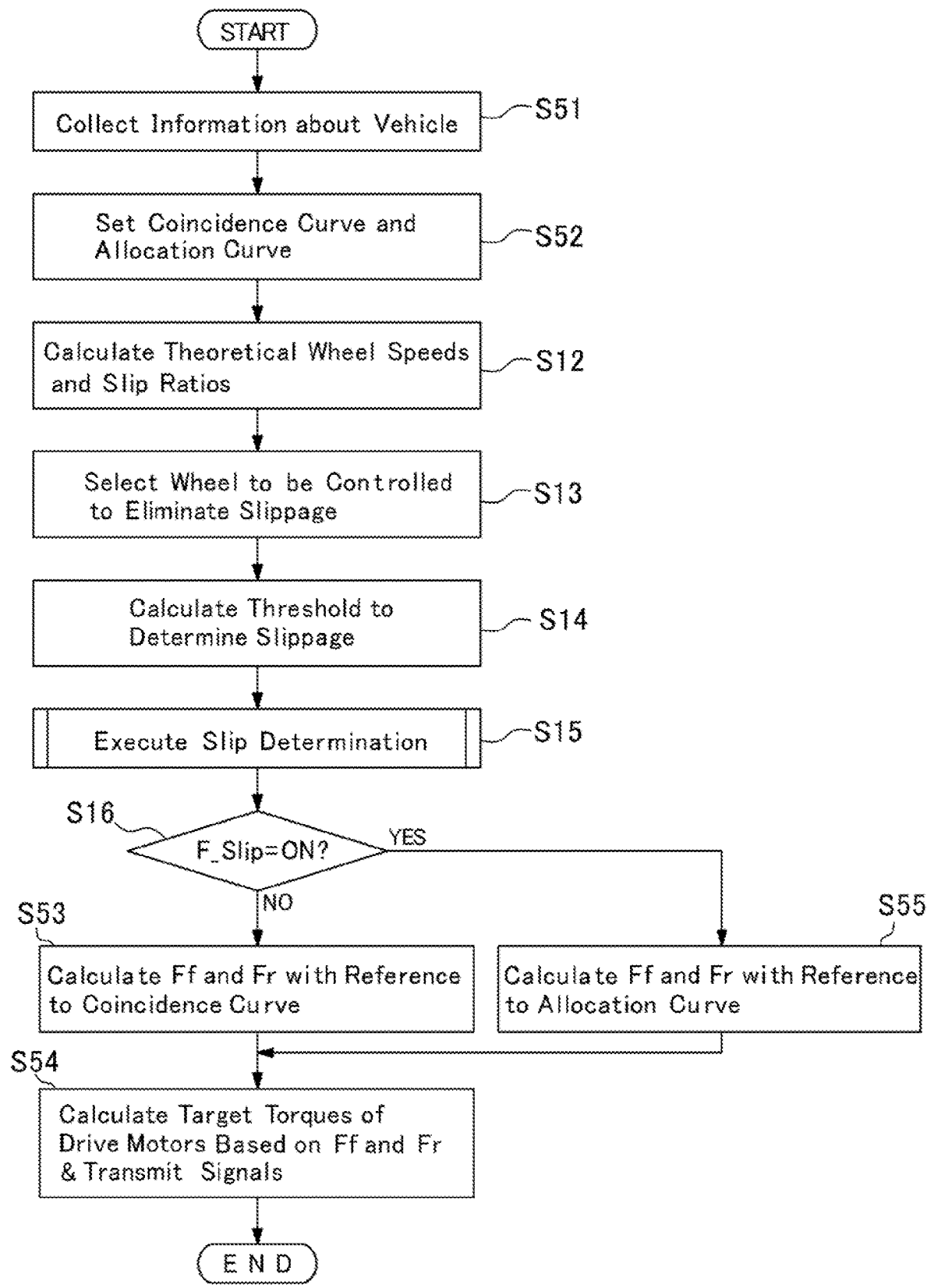
FIG. 14 is a flowchart to control braking forces of the front wheels and rear wheels so as to prevent an occurrence of slippage of the rear wheels.

According to the foregoing examples, the theoretical wheel speed is calculated based on the vehicle speed calculated based on the wheel sped and so on. However, if the vehicle speed may not be obtained accurately due to slippage of the wheel or variation in the friction between the wheel and the road surface, the theoretical wheel speed may not be calculated accurately and the slip-eliminating control may not be executed effectively. Therefore, in order to prevent a reduction in the frictional force acting between the rear wheels $43rr$ and $43rl$ and the road surface, in other words, in order to prevent an occurrence of slippage of the rear wheels $43rr$ and $43rl$, the driving force control system according to the embodiment of the present disclosure is further configured to control a distribution ratio of the torque distributed to the pair of front wheels $43fr$ and $43fl$ and the pair of rear wheels $43rr$ and $43rl$ when breaking the vehicle Ve. Procedures of such control are shown in FIG. 14.

At step S51, information about the vehicle Ve is collected, and a target braking force Fall is calculated. Specifically, the information collected at step S51 includes at least a longitudinal axle load, a wheelbase, a height of the center of gravity, a total weight of the vehicle Ve including a passenger and a burden, a stroke of the brake pedal, a vehicle speed V0, an actual speed Vw_fr_act of the right front wheel $43fr$, an actual speed Vw_fl_act of the left front wheel $43fl$, an actual speed Vw_rr_act of the right rear wheel $43rr$, and an actual speed Vw_rl_act of the left rear wheel $43rl$. For example, the longitudinal axle load and the weight of the vehicle Ve may be calculated based on the data stored in the first ECU 56, a compression of a suspension mechanism and so on. The stroke of the brake pedal may be calculated based on a detection signal transmitted from a sensor for detecting a position of the brake pedal. Optionally, a pedal force applied to the brake pedal may also be collected at step S51.

Figure 15:
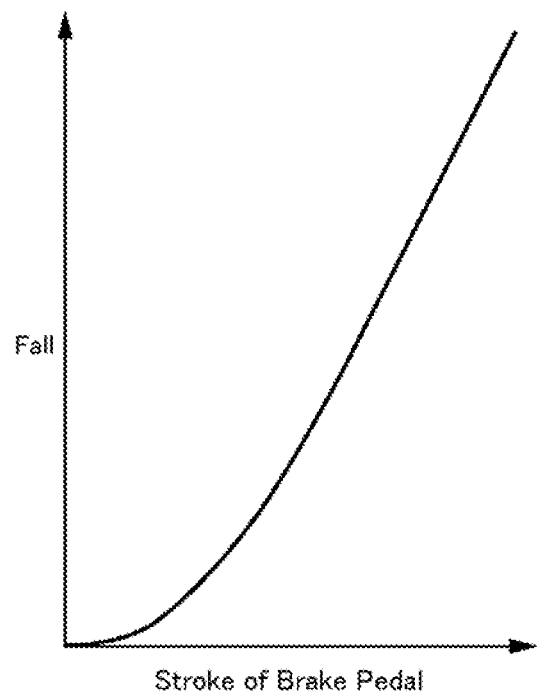
FIG. 15 is a map determining a braking force of the vehicle based on a stroke of a brake pedal.

The target braking force Fall may be calculated with reference to a map shown in FIG. 15 which is installed in the first ECU 56. In the map shown in FIG. 15, the horizontal axis represents the stroke of the brake pedal, and the vertical axis represents the target braking force Fall. As can be seen from FIG. 15, the target braking force Fall is increased exponentially with an increase in the stroke of the brake pedal. Optionally, in order to calculate the target braking force Fall, a function may be defined based on the stroke of the brake pedal, the vehicle speed, and the pedal force applied to the brake pedal, and a coefficient of such function may be altered in accordance with the longitudinal axle load and the weight of the vehicle Ve.

Figure 16:
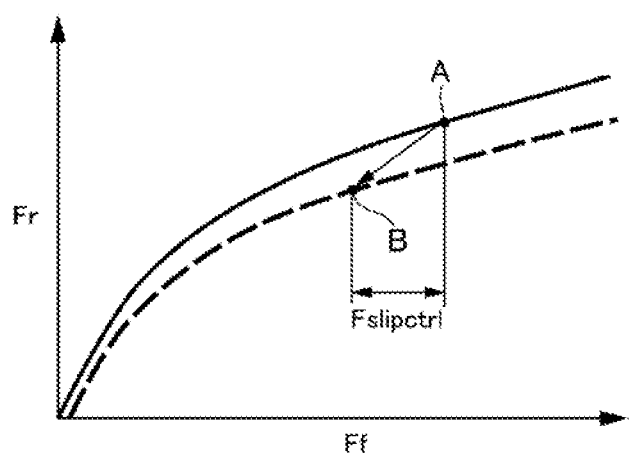
FIG. 16 is a map including a first map and a second map individually determining braking forces of the front wheels and the rear wheels.

Then, the routine progresses to step S52 to set a coincidence curve as a first map represented by the solid curve shown in FIG. 16, and an allocation curve as a second map represented by the dashed curve shown in FIG. 16. Specifically, the coincidence curve determines a braking force Ff applied to the pair of front wheels $43fr$ and $43fl$ and a braking force Fr applied to the pair of rear wheels $43rr$ and $43rl$ which lock the pair of front wheels $43fr$ and $43fl$ and the pair of rear wheels $43rr$ and $43rl$ simultaneously, given that a coefficient of friction of the road surface is constant. In other words, the coincidence curve determines a relation between the braking force Ff applied to the pair of front wheels $43fr$ and $43fl$ and the braking force Fr applied to the pair of rear wheels $43rr$ and $43rl$ such that the slip ratio of the front wheels $43fr$ and $43fl$ and the slip ratio of the rear wheels $43rr$ and $43rl$ exceed the acceptable value simultaneously, given that the coefficient of friction of the road surface is constant. On the other hand, the allocation curve determines a relation between a braking force Ff applied to the pair of front wheels $43fr$ and $43fl$ and a braking force Fr applied to the pair of rear wheels $43rr$ and $43rl$ in the event of slippage of the pair of front wheels $43fr$ and $43fl$. As indicated by the solid curve in FIG. 16, the coincidence curve is set in such a manner that the braking force Fr applied to the pair of rear wheels $43rr$ and $43rl$ is reduced less than the braking force Ff applied to the pair of front wheels $43fr$ and $43fl$. On the other hand, as indicated by the dashed curve in FIG. 16, the allocation curve is set in such a manner that the braking force Fr applied to the pair of rear wheels $43rr$ and $43rl$ is further reduced predetermined percentage K to be less than the braking force Ff applied to the pair of front wheels $43fr$ and $43fl$, compared to the braking force Fr determined by the coincidence curve. During execution of the routine shown in FIG. 16, the rear drive motor $2r$ and the rear brake mechanism Br establis the braking force applied to the pair of rear wheels $43rr$ and $43rl$.

Here, it is to be noted that the braking force Ff is a total value of a braking force applied to the right front wheel $43fr$ and a braking force applied to the left front wheel $43fl$, and that the braking force Fr is a total value of a braking force applied to the right rear wheel $43rr$ and a braking force applied to the left rear wheel $43rl$. In other words, the braking force Ff applied to the pair of front wheels $43fr$ and $43fl$ is established by a braking torque generated by the front drive motor $2f$ and the front brake mechanism Bf, and the braking force Fr applied to the pair of rear wheels $43rr$ and $43rl$ is established by a braking torque generated by the rear drive motor $2r$ and the rear brake mechanism Br.

Figure 7:
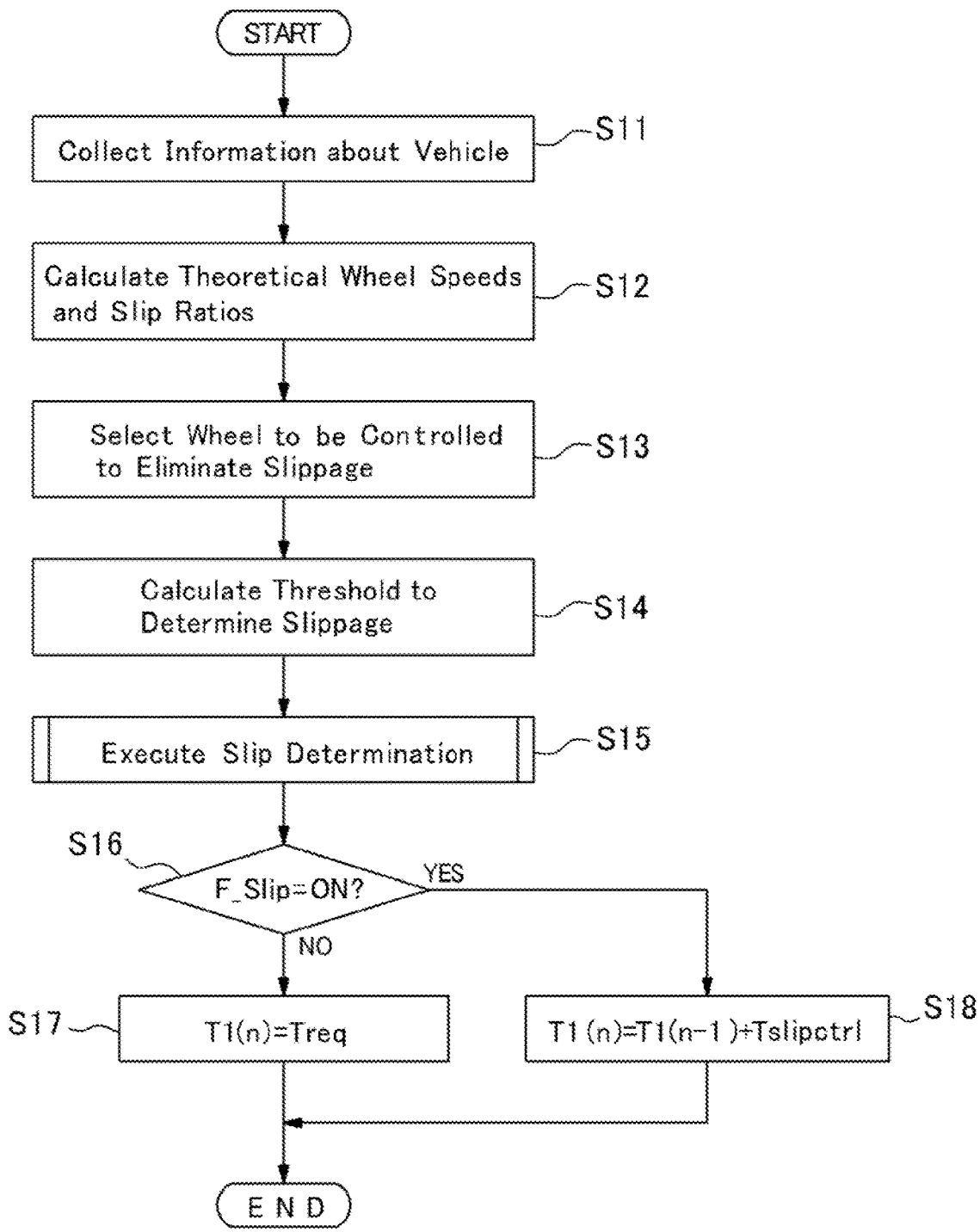
FIG. 7 is a flowchart showing an example of a routine to control torque of a drive motor in the event of slippage of a pair of right wheel and a left wheel.

After setting the coincidence curve and the allocation curve at step S52, the foregoing steps S12 to S16 shown in FIG. 7 are executed sequentially. Detained explanations for steps S12 to S16 are omitted.

If the slip flag F_Slip is turned off so that the answer of step S16 is NO, the routine progresses to step S53 to set the braking force Ff applied to the pair of front wheels $43fr$ and $43fl$ and the braking force Fr applied to the pair of rear wheels $43rr$ and $43rl$ based on the coincidence curve. Then, at step S54, target torques of the front drive motor $2f$ and the rear drive motor $2r$ are calculated based on: the braking force Ff and the braking force Fr set at step S53; a gear ratio between the front drive motor 2f and the pair of front wheels 43fr and 43fl; a gear ratio between the rear drive motor 2r and the pair of rear wheels 43rr and 43rl, and so on. The target torques of the front drive motor 2f and the rear drive motor 2r thus calculated are transmitted in the form of command signals to the devices involved in generating the torques by the front drive motor 2f and the rear drive motor 2r, and thereafter the routine returns. That is, at step S53, a target braking force Fall is determined on the coincidence curve shown in FIG. 16, and the braking force Ff applied to the pair of front wheels 43fr and 43fl and the braking force Fr applied to the pair of rear wheels 43rr and 43rl are calculated based on the target braking force Fall.

By contrast, if the slip flag F_Slip is turned on so that the answer of step S16 is YES, the routine progresses to step S55 to correct the braking force Ff applied to the pair of front wheels 43fr and 43fl based on the torque of the front drive motor 2f corrected at step S18 of the routine shown in FIG. 7, and to calculate the braking force Fr applied to the pair of rear wheels 43rr and 43rl based on the braking force Ff thus corrected with reference to the allocation curve. In FIG. 16, the point A represents the braking force Ff and the braking force Fr before correcting the braking force Ff, and the point B represents the braking force Ff and the braking force Fr after correcting the braking force Ff.

Then, at step S54, a target torque of the rear drive motor 2r is calculated based on the braking force Ff and the braking force Fr set at step S55, and the target torque of the rear drive motor 2r thus calculated are transmitted to the rear drive motor 2r in the form of command signals. Thereafter, the routine returns.

Thus, when the braking force of the pair of front wheels is reduced in the event of slippage of the pair of front wheels, the braking force of the pair of rear wheels is reduced based on the allocation curve shown in FIG. 16 so as to prevent an occurrence of slippage of the pair of rear wheels. For this reason, a running stability and a braking performance may be ensured. Further, since an occurrence of the pair of rear wheels can be prevented, a rotational speed of the pair of rear wheels can be estimated accurately. For this reason, the theoretical speed of the pair of rear wheels can be calculated accurately so that the slip eliminating control can be executed effectively. Specifically, in the event of slippage of the pair of front wheels, the pair of rear wheels passes through the road surface at which a frictional coefficient is low after the pair of front wheels. Therefore, in addition to the above-explained advantages, an occurrence of the pair of rear wheels can be prevented by merely reducing the braking force of the pair of rear wheels when the slippage of the pair of front wheels is detected, while executing the slip-eliminating control of only the pair of front wheels. That is, the slip-eliminating control can be simplified to eliminate slippages of both pairs of wheels.

Although the above exemplary embodiments of the present disclosure have been described, it will be understood by those skilled in the art that the present disclosure should not be limited to the described exemplary embodiments, and various changes and modifications can be made within the scope of the present disclosure. For example, a conventional limit slip differential (i.e., an LSD) may also be adopted as the drive unit 1. Further, the drive unit 1 may be arranged at least between the right front wheels 43fr and the left front wheel 43fl. In addition, the steering mechanism 44 may be connected to the front wheels not only mechanically but also electrically.

What is claimed is:

1. A driving force control system for a vehicle, comprising:
a drive unit including
a torque generating device that generates a driving torque or a braking torque,
a differential mechanism that is connected to a right wheel and a left wheel in such a manner as to allow the right wheel and the left wheel to rotate differentially from each other, and to distribute the torque generated by the torque generating device to the right wheel and the left wheel, and
a differential restricting device that restricts a differential rotation between the right wheel and the left wheel; and
a controller that controls the drive unit,
wherein the controller is configured to
calculate a slip ratio of the right wheel as a ratio of a difference between an actual speed of the right wheel and a theoretical speed of the right wheel calculated based on a speed of the vehicle to the theoretical speed,
calculate a slip ratio of the left wheel as a ratio of a difference between an actual speed of the left wheel and a theoretical speed of the left wheel calculated based on the speed of the vehicle to the theoretical speed,
restrict a differential rotation between the right wheel and the left wheel less than a predetermined value by the differential mechanism, and
execute a slip-eliminating control to restrict the driving torque or the braking torque generated by the torque generating device thereby reducing the slip ratio of one of the wheel whose slip ratio is smaller than the slip ratio of the other one of the wheels, if the slip ratio of one of the wheels that is smaller than the slip ratio of the other one of the wheels is greater than an acceptable value.

2. The driving force control system for the vehicle as claimed in claim 1,
wherein the drive unit is connected to a pair of front wheels,
the driving force control system further comprises a brake mechanism that applies a braking torque to a pair of rear wheels,
the controller comprises
a first map that determines a relation between the braking force applied to the pair of front wheels and the braking force applied to the pair of rear wheels when the pair of front wheels and the pair of rear wheels slip simultaneously during decelerating the vehicle, and
a second map that reduces the braking force applied to the pair of rear wheels compared to the braking force determined with reference to the first map,
the controller is further configured to
calculate the braking force applied to the pair of front wheels and the braking force applied to the pair of rear wheels with reference to the first map when the slip-eliminating control is not executed, and
calculate the braking force applied to the pair of rear wheels with reference to the second map when the braking force applied to the pair of front wheels is reduced as a result of executing the slip-eliminating control.

3. The driving force control system for the vehicle as claimed in claim 2, wherein the controller is further configured to
reduce the driving torque or the braking torque generated by the torque generating device if the difference between the actual speed and the theoretical speed of the one of the wheel whose slip ratio is smaller than the other wheel during execution of the slip-eliminating control is greater than a predetermined value, and increase the driving torque or the braking torque generated by the torque generating device if the difference between the actual speed and the theoretical speed of the one of the wheel whose slip ratio is smaller than the other wheel during execution of the slip-eliminating control is less than the predetermined value.

4. The driving force control system for the vehicle as claimed in claim 3, wherein the controller is further configured to terminate the slip-eliminating control when the driving torque or the braking torque generated by the torque generating device is increased to a required torque of the vehicle during execution of the slip-eliminating control.

5. The driving force control system for the vehicle as claimed in claim 1, wherein the controller is further configured to reduce the driving torque or the braking torque generated by the torque generating device if the difference between the actual speed and the theoretical speed of the one of the wheel whose slip ratio is smaller than the other wheel during execution of the slip-eliminating control is greater than a predetermined value, and increase the driving torque or the braking torque generated by the torque generating device if the difference between the actual speed and the theoretical speed of the one of the wheel whose slip ratio is smaller than the other wheel during execution of the slip-eliminating control is less than the predetermined value.

6. The driving force control system for the vehicle as claimed in claim 5, wherein the controller is further configured to terminate the slip-eliminating control when the driving torque or the braking torque generated by the torque generating device is increased to a required torque of the vehicle during execution of the slip-eliminating control.

\* \* \* \* \*